United States Patent [19]

Yasui et al.

[11] Patent Number: 4,571,721

[45] Date of Patent: Feb. 18, 1986

[54] COMPOSITE CONCENTRATION SYSTEM

[75] Inventors: Tadahiko Yasui, Tokyo; Shizuo Ito; Akira Horiki, both of Kanagawa; Hajime Yamada; Takashi Usami, both of Tokyo, all of Japan

[73] Assignees: Nippon Telegraph & Telephone Public Corporation; Nippon Electronic Co., Ltd.; Hitachi, Ltd.; Oki Electric Industry, Ltd.; Fujitsu Limited, all of Japan

[21] Appl. No.: 418,898

[22] Filed: Sep. 16, 1982

[30] Foreign Application Priority Data

Sep. 18, 1981 [JP] Japan ............................. 56-147573

[51] Int. Cl.$^4$ ........................................... H04Q 11/04
[52] U.S. Cl. ................................... 370/56; 179/18 FC
[58] Field of Search ................ 370/56, 58; 179/18 FC

[56] References Cited

U.S. PATENT DOCUMENTS

| | | | |
|---|---|---|---|
| 3,878,338 | 4/1975 | Hardy | 370/56 |
| 4,075,432 | 2/1978 | Renaudin | 370/56 |
| 4,288,870 | 9/1981 | McDonald et al. | 370/56 |
| 4,327,436 | 4/1982 | Ohara et al. | 370/56 |

FOREIGN PATENT DOCUMENTS 0124392 7/1983 Japan ................................... 370/56

OTHER PUBLICATIONS

International Switching Symposium; Kyoto, Japan, Oct. 25-29, 1976, "Subscriber Connecting Equipment", pp. 421-3-1 to 421-3-7.

Primary Examiner—Douglas W. Olms
Attorney, Agent, or Firm—Remy J. VanOphem

[57] ABSTRACT

In a composite concentration system of the type utilizing a time division system in which voice signals are digitized and then concentrated in a traffic, there are provided a first subscriber line interface means of a first type which connects subscriber lines directly to subscriber line interface circuits, a second subscriber line interface means of a second type which connects subscriber lines to subscriber line interface circuits via a space division concentration switch and a time division concentration switch connected to the first and second subscriber line interface means via switching interfaces. The number of output terminals of the first subscriber line interface means is equal to that of the output terminals of the second subscriber line interface means when a concentration ratio of the space division concentration switch to the second subscriber line interface means is 1:1 and corresponding output terminals are constructed such that the same channel is assigned to the time division concentration switch. The composite concentration system of this invention is inexpensive and can readily expand a telephone system according to a variation in percentage of calls or change in a service performance.

6 Claims, 11 Drawing Figures

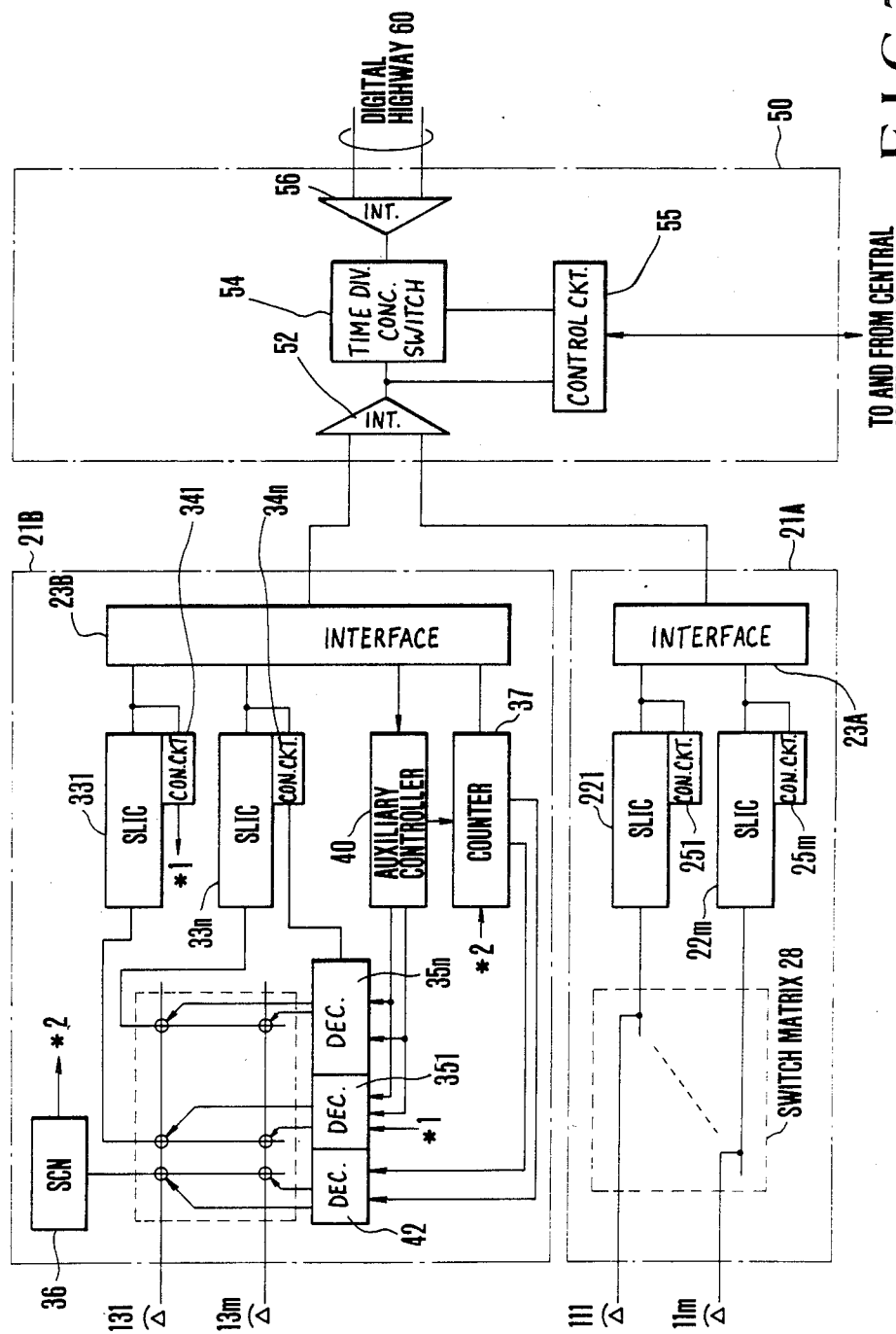

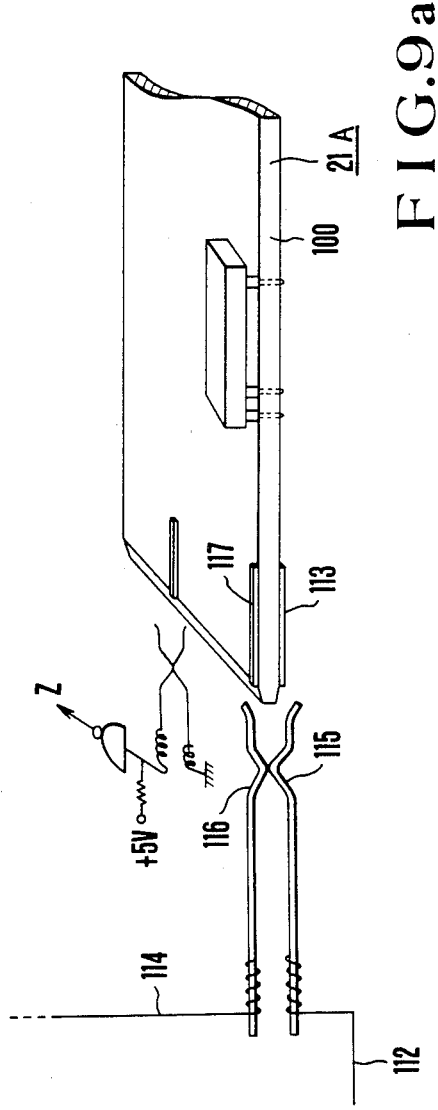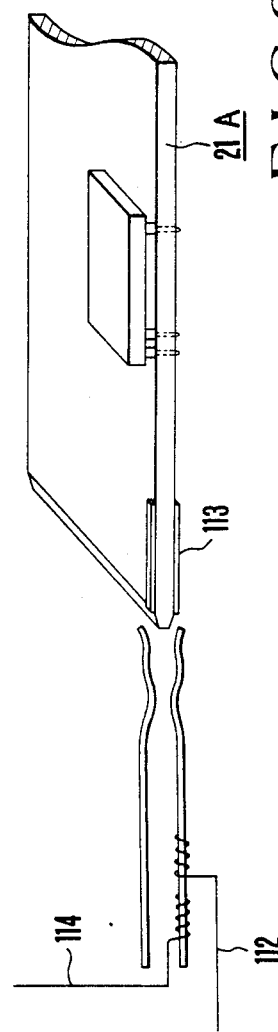

4,571,721

COMPOSITE CONCENTRATION SYSTEM

BACKGROUND OF THE INVENTION

1. Field of the Invention

This invention relates to a composite concentration system, and more particularly a concentration system for concentrating subscriber lines of a digital local switching system.

2. Description of the Prior Art

As is well known in the art, the size and scale of a local switching system are determined by taking into consideration such factors as the number of subscriber lines, the content of the service to be provided (percentage of call falls, for example), the types of subscribers and the type and scale of the system.

The local switching systems generally used are classified into two types, one a space division system, and the other, a time division system.

In a space division system the subscriber lines connected to telephone terminal sets of individual subscribers are firstly accommodated in a space division concentration stage. In this stage, the lines are collected at different concentration ratios for the different types of subscribers, such as residential subscribers or lines as well as for public uses. For example, since the frequency use of common residential subscriber lines is generally low, the line concentration ratio is 10:1, whereas in the public subscriber lines, where frequency of utilization is high, the lines are concentrated at a concentration ratio of 2:1. In this manner, the subscriber lines are concentrated into fewer signal lines than the quantity of subscriber lines. The signals of these signal lines are multiplexed through A-D and D-A converters constituting the subscriber line interface circuit and then are accommodated in a distribution stage.

In a space division system, as described above, the subscriber lines are concentrated at the space division concentration stage and then are connected to the subscriber line interface circuits so that, when considered in the units of the subscribers, the number of expensive subscriber line interface circuits can be reduced, thus decreasing the installation cost of the whole system. The space division concentration circuits utilized in this stage, however, must have a different construction for different types of subscribers and different types of subscriber line interface circuits. This not only complicates the overall system but also increases the cost. Moreover, since the controls of the space division concentration stage should be different depending upon the types of the subscribers and subscriber line interface circuits, it is difficult to adequately and economically improve the service performance by adding a new subscriber line interface circuit in response to an increase in the quantity of subscriber lines, and an increase in the number of calls due to increases in the frequency of use.

On the other hand, in a time division system, each subscriber line is accommodated in a time division concentration stage through A-D and D-A converters consisting of a single subscriber line interface circuit. At the concentration stage, the traffic in which calls and pagings for m subscriber lines are made is limited to n channels by a time switch, and the signals are then accommodated in a distribution stage through a digital highway. In a time division system, since it is necessary to provide a subscriber line interface circuit for each subscriber line, and since it is necessary to provide a buffer memory device for each subscriber line in order to execute a time switch processing, a time division system is more expensive than a space division system at a low percentage of calls. It is not necessary, however, to provide a space division concentration stage consisting of various combinations of circuit elements at the preceding stage of the subscriber line interface circuit. Accordingly, the construction of the time division system is definite or fixed and simple, irrespective of high or lower percentage of the calls. For this reason, a time division or concentration system becomes less expensive than a space division system at high percentage of calls. Since the time division has a simple construction, addition of the service and new capabilities to the subscriber line interface circuit can be made more easily than the space division system without increasing the installation cost.

As above described, the space division system and the time division system have inherent advantages and disadvantages so that, when installing a telephone exchange in a district, the system to be adapted and the construction of the subscriber lines are determined by considering the type of subscriber, the number of the subscriber lines necessary in that district, the service required, and the percentage of calls.

Generally, however, the number of the subscribers, the type thereof, and service vary with time so that it is necessary to change the concentration system of the subscriber lines in accordance with such variation. In the prior art, although the subscriber lines have been designed by forecasting the future increase in the number of subscriber lines, their design is fixed once the telephone system is installed and, therefore, it is not possible to modify the system in the future. Accordingly, when changing the concentration system of the existing subscriber lines it is necessary not only to exchange substrates but also to change wirings resulting from the exchange of the substrates. Such operations require much labor and time and also must be tested after modification.

SUMMARY OF THE INVENTION

Accordingly, it is a principal object of this invention to provide a novel line concentration system having a versatility for variations in the percentage of calls and service and economy.

Another object of this invention is to provide a composite line concentration system capable of readily expanding the system by using common component parts.

To accomplish these and further objects, the invention contemplates utilization of respective advantages of a space division system and a time division system. Basically, the invention is a time division system in which voice signals are digitized and then concentrated in a traffic. A subscriber line interface means of a first type which connects the subscriber line directly to the subscriber line interface circuits and a subscriber line interface means of a second type in which the subscriber lines are connected to the subscriber line interface circuit, are provided, the first and second subscriber line interface means having the same number of output terminals for assigning the same channel to a time division concentration switch installed in a succeeding stage.

According to this invention, there is provided a composite concentration system of the type utilizing a time division system in which voice signals are digitized and then concentrated in a traffic, characterized in that there are provided a first subscriber line interface means of a first type which connects subscriber lines directly to the subscriber line interface circuits; a second subscriber line interface means of a second type which connects subscriber lines to subscriber interface circuits via a space division concentration switch; and a time division concentration switch connected to the first and second subscriber line interface means via switching interfaces. The number of output terminals of the first subscriber line interface means is equal to that of output terminals of the second subscriber line interface means when a concentration ratio of the space division concentration switch to the second subscriber line interface means is 1:1, the corresponding output terminals being constructed such that the same channel is assigned to the time division concentration switch.

BRIEF DESCRIPTION OF THE DRAWINGS

In the accompanying drawings:

FIG. 7 is a block diagram showing a modified embodiment of the composite concentration system embodying the invention;

FIGS. 9a and 9b are perspective views showing examples of dually reversing important subscribers.

DETAILED DESCRIPTION OF THE PREFERRED EMBODIMENT

Figure 1:
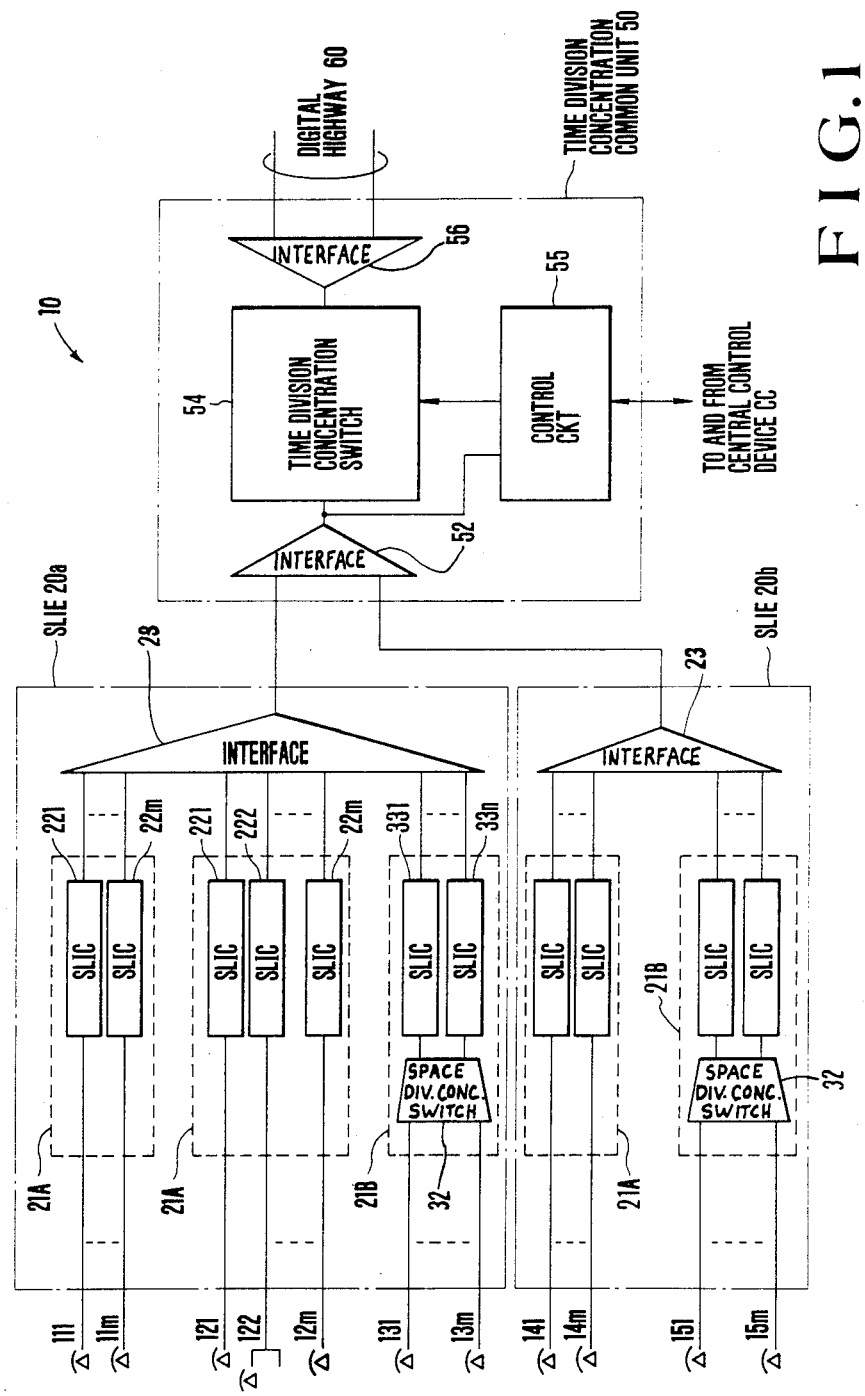
FIG. 1 is a block diagram showing one embodiment of the composite concentration system according to this invention.

A composite concentration system 10 of this invention shown in FIG. 1 consists of a plurality of subscriber line interface circuits (SLIE) 20a and 20b connected to respective subscriber terminals $111-11_m$, $121-12_m$, $131-13_m$, $141-14_m$, $151-15_m$, and a time division concentration unit 50, commonly connected to respective SLIEs. The common unit 50 is connected to a digital highway 60 which functions as time division talking channels.

The SLIEs 20a and 20b will now be described by taking the SLIE 20a as an example. The SLIE 20a characterizing the invention is constructed by two types of subscriber line interface means 21A and 21B and an interface 23. In this example, the SLIE 20a is constructed by two subscriber line interface means 21A of the first type and one subscriber line interface means 21B of the second type, while the interface 23 is commonly used for all of these subscriber line interface means 21A and 21b. Each of the subscriber line interface means 21A and 21B have common input/ouput conditions. More particularly, the number of subscriber terminals connected to the input side of each of the subscriber line interface means 21A and 21B is the same (in this example m=8). The subscriber line interface means 21A of the first type does not have concentrating capabilities, and has m output terminals, that is, the same number of output terminals as input terminals; and, the output terminals being connected to the interface according to an aligned order. The subscriber line interface means 21A sequentially assigns signals on respective output lines to one of a plurality of channels constituting one frame, or sequentially receives the signals of the plurality of channels on the output lines.

The subscriber line interface means 21B of the second type has a concentration capability so that its output terminals are concentrated to n output terminal. In this example, n=2. In general, n is less than m. However, these output terminals are designed such that when they are connected to the interface 23, they are assigned to n of the time channels of the same timings as those of the respective time channels of the subscriber line interface means 21A of the first type.

The subscriber line interface means 21A and 21B will now be described in greater detail.

The subscriber line interface means 21A is provided with subscriber line interface circuits (SLIC) $221-22_m$, respectively, each directly connected to one of the m subscriber lines or subscriber terminals $111-11_m$ or $121-12_m$. In this case, the subscriber terminals include terminals for usual residence, public telephone sets, common telephone sets, PBX, key telephone sets, subscribers having common telephone numbers and a high percentage of calls, digital facsimiles, digital data inter-digital telephone sets, and emergency telephone sets.

Each of the subscriber line interface circuits $221-22_m$ functions to assign to a predetermined traffic connected to respective subscriber lines, and vice versa. Consequently, each of these subscriber line interface circuits $221-22_m$ has the features and capabilities of subscriber line signal transmitting and receiving trunk devices used for usual space division type telephone set, well known in the art, and a PCM channel encoding capability that converts such analog signals as voice signals into digital signals. That is, each of the subscriber line interface circuits $221-22_m$ has so-called BORSCHT capabilities, which is an acronym for the combined features of battery (source supply), overload protection, ringing (ringing signal supply), supervision, codes (encoding and decoding performances), hybrid (two wire- four wire transformer) and test (subscriber's line testing performance). The use of such a term is disclosed in I.E.E.E. Spectrum, 1977, February, at page 46, for example. The component parts for realizing such a BORSCHT capability are required to have strict electrical characteristics. For example, due to leakage, a voltage of 350 V, and a current of 200 mA are applied to component parts. For this reason, component elements having high voltage durability and large power ratings are required. With recent developments in electronics, however, miniaturized and integrated thyristor switch elements satisfying the above described requirements have been developed.

The output terminals of the subscriber line interface circuits $221-22_m$ having the BORSCHT capabilities described above are connected to the interface 23 that multiplexes and demultiplexes voice signals and control signals. In this case, a predetermined channel is used between respective output terminals of the subscriber line interface circuits $221\text{-}22_m$ and the interface 23 for transmitting and receiving the voice signals and the control signals.

Figure 2:
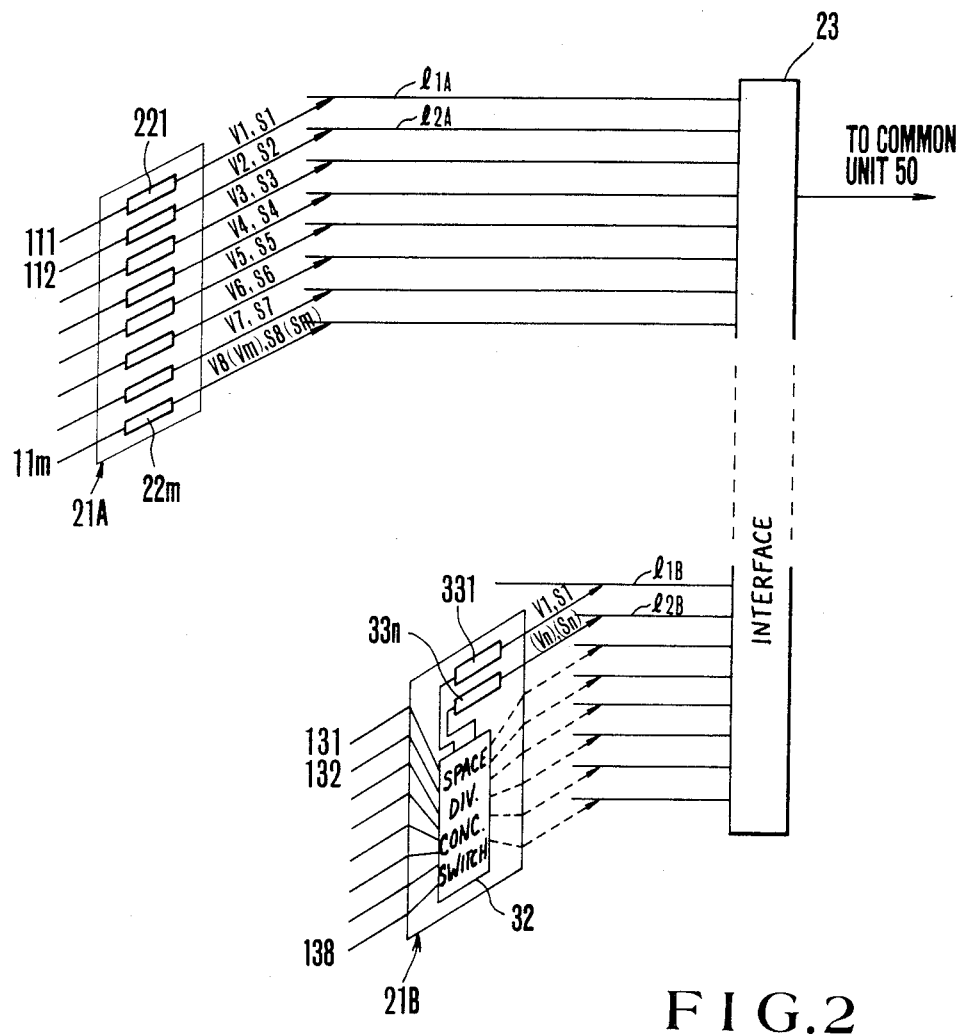
FIG. 2 is a perspective view showing the output terminals of the subscriber line interface means of the first and second type utilized in the system shown in FIG. 1.
Figure 3:
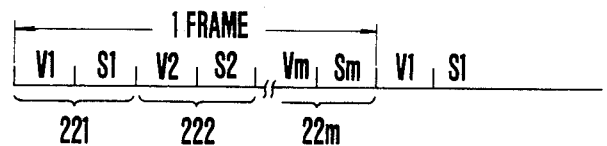
FIG. 3 is a timing chart showing the relationship between signals sent and received at the output terminals of respective subscriber line interface means shown in FIG. 2 and signals sent and received by an interface.

FIG. 2 illustrates channel assignment relations between the output terminals of respective subscriber line interface circuits $221\text{-}22_m$ and the interface 23, in which letters $V_1$, $V_2$ ... applied to the output sides of respective subscriber line interface circuits $221\text{-}22_m$ represent voice signals, and $S_1$, $S_2$ ... represent control signals. These signals are assigned to respective channels, according to the timing shown in FIG. 3, to be sent to a common unit 50 in a succeeding stage. As can be noted from FIG. 3, the fact that the output conditions of respective subscriber line interface means are the same means than in each subscriber line interface means, the number of channels constituting one frame are the same. The output terminal of each subscriber line interface means is sequentially assigned to a corresponding channel according to an aligned order. Furthermore, as FIG. 3 shows, a voice signal and a control signal corresponding to one subscriber line interface circuit are assigned to adjacent channels. For example, the channel to which the voice signal $V_1$ is assigned at an output terminal of the subscriber line interface circuit 221, is adjacent to a channel for its control signal $S_1$.

The subscriber line interface means 21B of the second type consists of a one stage space division type concentration switch having a concentration ratio of n/m and having an input side connected to m subscriber lines, that is to the subscriber terminals $131\text{-}13_m$, and n (in this example n=2) subscriber line interface circuits 331 and $33_n$ connected to the output side of the concentration switch.

These subscriber line interface circuits 331 through $33_n$ are identical or substantially identical to the subscriber line interface circuits $221\text{-}22_m$ described above and have aforementioned BORSCHT capabilities.

The output terminals of the subscriber line interface circuits 331 through $33_n$ are connected to the interface 23 which multiplexes and demultiplexes the voice signal and the control signal. In this case, a predetermined channel is connected between the output terminals of the subscriber line interface circuits and the interface 23 for transmitting and receiving the voice signal and the control signal.

In the system having the construction described above, when a terminal 111, for example of a telephone set, is in use, a voice signal $V_1$ and a control signal $S_1$ are sent to the interface 23 acting as the multiplexing and demultiplexing circuit. The multiplexed signals are sent to an interface 52 acting as a multiplexing and demultiplexing circuit where the signals are further multiplexed together with signals from SLIE 20b and other data or signals. Among the multiplexed signals sent out from the interface 52, the voice signal is sent to a time division concentration switch 54, while the control signal is sent to a control circuit 55 and to a central control device CC, not shown. The voice signal collected or distributed by the time division concentration switch 54 is sent out to the digital highway 60 via the interface 56 acting as a multiplexing and demultiplexing circuit.

Conversely, the voice signal $V_1$ directed to the telephone set terminal 111 is sent to the subscriber line interface means 21A of the first type via the digital highway 60, interface 56, time division concentration switch 54 and interfaces 52 and 23. The control signal $S_1$ corresponding to the voice signal $V_1$ is sent from the central control device CC to the subscriber line interface circuit 221 via the control circuit 55 and interface 52 and 23 so as to control the subscriber line interface circuit 221 for sending the voice signal to the telephone set terminal 111. Since the method of processing the voice signal sent from the telephone set terminal 111 to the digital highway 60 or vice versa is well known, it will not be described herein.

In this system, it is to be particularly noted that the subscriber line interface means 21A has no concentration performance but directly connects the subscriber terminal to the subscriber line interface circuit for forming a time divisioned signal to be assigned to a predetermined time slot or channel, and that whereas the subscriber line interface means 21B operates such that after concentrating the lines with a one stage space division concentration switch, it connects the line to the subscriber line interface circuit to obtain a time divisioned signal assigned to a predetermined time slot or channel. The use of two such types of subscriber line interface means permits standardization of the construction of the subscriber line interface circuit so as to meet various requirements, thus eliminating any special change in the design and wiring.

It is also to be noted that the input/output conditions for the subscriber line interface means 21A and 21B are uniform. More particularly, each of these subscriber line interface means is constructed such that m subscriber terminals are connected to its input terminal.

Since the subscriber line interface means 21A of the first type is connected directly to a subscriber line interface circuit, the number of its output terminals is the same as that of the input terminals, that is m. At these output terminals, voice and control signals are generated at predetermined timings which are assigned to predetermined adjacent channels when these signals are multiplexed in pairs. Accordingly, when viewed from the input side of the time division concentration switch 54 of the common time division concentration unit 50 it will be clear that signals at the output terminals of the subscriber line interface means 21A of the first type are assigned to predetermined channels according to the same order as the signals appearing at the output terminals of the other subscriber line interface means 21B.

The same is true for the subscriber line interface means 21B of the second type. More particularly, the number of subscriber terminals is the same as that of the subscriber line interface means 21A, that is m. After being concentrated to a number n (in this example 2) by a space division concentration switch 32, the terminals are connected to the subscriber line interface circuits 331 through $33_n$. Consequently, although the number of the output terminals of this subscriber line interface means 21B is n, the voice and control signals appearing thereon are assigned to the same channels to which signals of the subscriber line interface means 21A have been assigned. As a consequence, where the space division concentration switch 32 has a concentration ratio of 1:1, the signals at respective output terminals are assigned to the same channel according to their order as that to which the signals of the subscriber line interface means 21A have been assigned.

Consequently, the subscriber line interface means 21A and 21B are exchangeable. Thus, when these circuit means are formed into plug-in type packages in which each subscriber line interface means is fabricated on a single printed substrate, the concentration system can be changed by merely substituting one package with the other.

This will be described with reference to FIG. 2. For example, when the percentage of call loss of subscriber terminals on which the subscriber line interface means 21B has been mounted exceeds a predetermined ratio and the concentration ratio of the space division concentration switch 32 has decreased, but still a large percentage of call loss appears, the subscriber line interface means 21B of the second type is replaced by the subscriber line interface means 21a of the first type. In this case, to the input lines $l_{1B}$ of the interface 23 to which signals ($V_1$, $S_1$) at the output terminals of the present subscriber line interface means 21B have been applied, will be connected to the output terminals which transmit and receive the signals ($V_1$, $S_1$) of the subscriber line interface means 21A which are sent out at the same timings. As a consequence, even when the subscriber line interface means are exchanged, signals appearing on the multiplexed output side of the interface 23 would not change.

Figure 4:
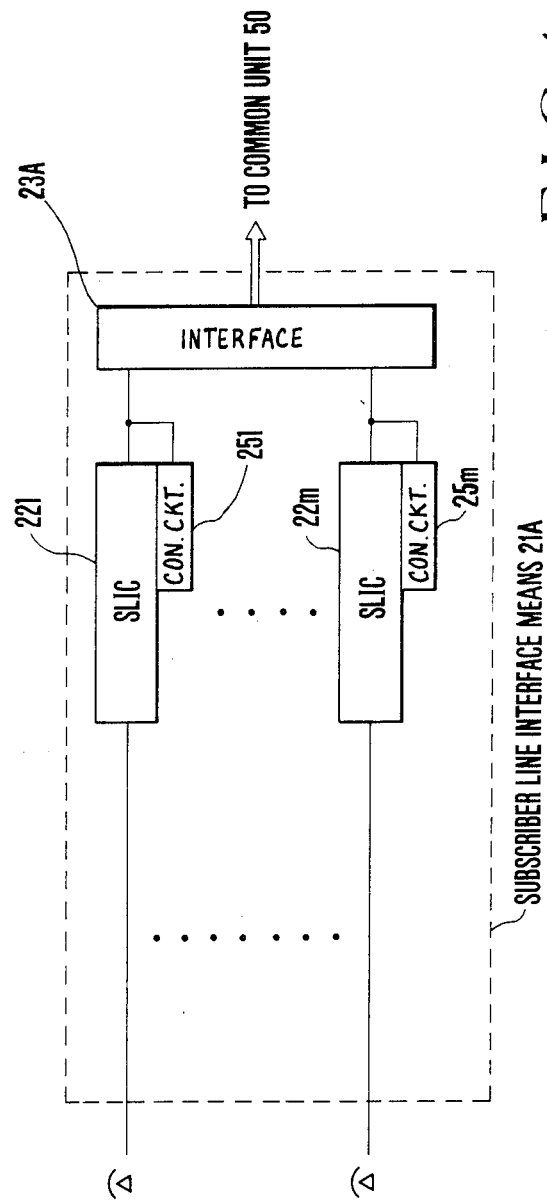
FIG. 4 is a block diagram showing one example of the subscriber line interface means of the first type utilized in the system shown in FIG. 1 and incorporated with an interface.

FIG. 4 shows the detail of the subscriber line interface means 21A in which the interface 23 is divided into a plurality of groups and one of them is incorporated into the subscriber line interface means 21A. In FIG. 4, respective subscriber line interface circuits $221-22_m$ are provided with independent control circuits $251-25_m$ which extract only a control signal S supplied from an interface 23A at a predetermined timing. Based on the control signal $S_1$ to $S_m$, each control circuit performs such control functions as sending a call signal to a corresponding subscriber line, detection of a response signal, transmission of a reverse signal, etc. The control signal $S_1$ to $S_m$ is sent to the interface 23A from the common time division concentration unit 50 via a multiplexed line.

A state signal regarding each subscriber line, for example a signal obtained by scanning the state of each subscriber line at a predetermined timing, is sent to the interface 23A through opposite routing at a timing at which the signal is inserted into a specifically assigned channel. This signal is sent to the common unit 50 through the interface 23A to be used as a control signal. The extraction, and transmission of these control signals, as well as the control operations of the telephone exchange based on these signals will not be described herein since they are well known in the art.

Regarding FIG. 4, it should be particularly noted that the interface 23A has been incorporated into the subscriber line interface means 21A. Then, when compared with the example shown in FIG. 1, it is possible to decrease the number of the external terminals of the package, thus greatly simplifying the peripheral circuits.

Figure 5:
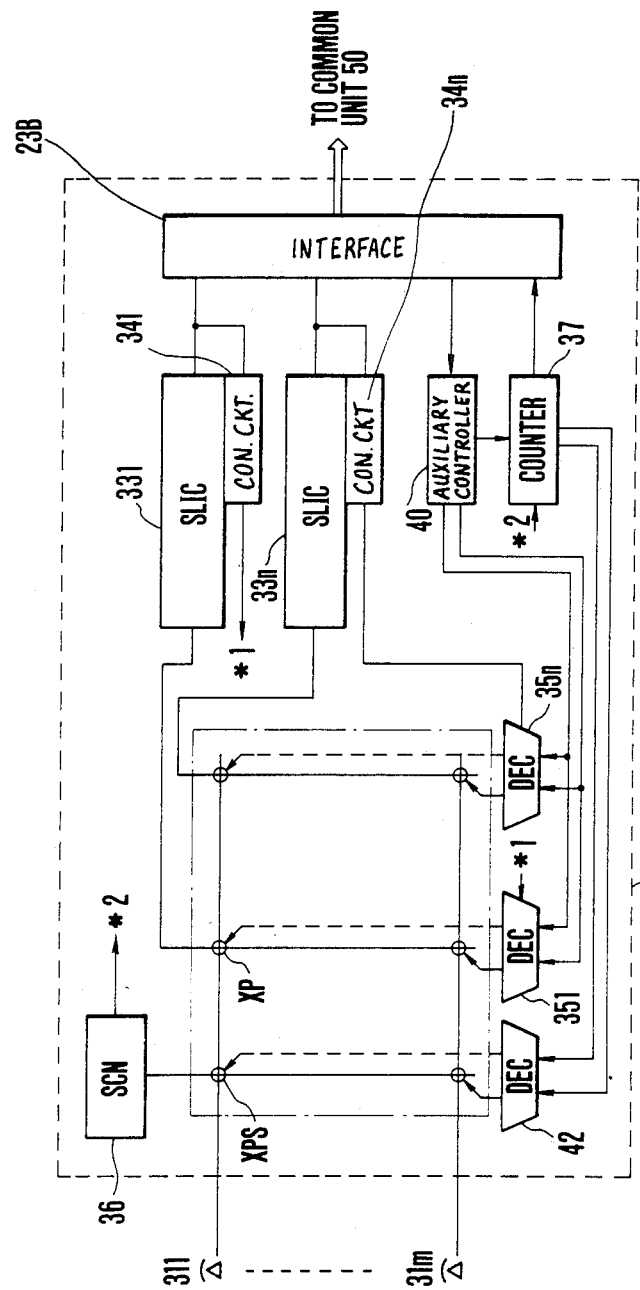
FIG. 5 is a block diagram showing one example of the subscriber line interface means of the second type utilized in the system shown in FIG. 1 and incorporated with the interface.

FIG. 5 shows in more detail the subscriber line interface means 21B in which the interface 23B is incorporated into the subscriber line interface means 21B. In FIG. 5 a one stage space division concentration switch 32 concentrates lines from the subscriber terminals on the space division basis and selectively connects the lines to the subscriber line interface circuits 331 to $33_n$. The space division concentration switch 32 has a matrix construction and at the cross-points of the matrix is connected to well known high voltage IC switches which are selectively rendered on by the outputs of decoders 351 to $35n$ so as to interconnect one of the subscriber terminals and one of the subscriber lines.

For the purpose of checking the states of respective subscriber terminals, sensors XPS are provided for the space division concentration switch 32. By controlling a decoder 42 from an auxiliary controller 40 through a counter 37, supervisory signals can be obtained. These signals are sent to an interface 23B, via a route of a subscriber line scanning circuit 36-*2-, the counter 37 where they are multiplexed and then sent to the common time division concentration unit 50.

When supplied with a control signal from the common time division concentration unit 50 via the interface 23B, the auxiliary controller 40 transfers the control signal to decoders 351 to $35n$. The decoders 351 to $35n$ turn on IC switch XP respectively in accordance with the control signal, when signals are supplied to the decoder from the control circuits 341 to $34n$. In addition to the control of the IC switch XP, the auxiliary controller 40 drives the counter 37 designating the order of scanning of the subscriber line to send the output of the counter to the decoder 42 so as to control the operation of the subscriber line scanning circuit 36.

The subscriber line interface circuits 331 through $33_n$ have equal or substantially equal BORSCHT capabilities as the subscriber interface circuits $221-22_m$ utilized in the subscriber line interface means 21A described above, and control circuits 341 through $34_n$ so as to control the subscriber circuits 331 through $33_n$ based on the control signals supplied from the interface 23B and to send out a state signal regarding a subscriber line to the interface 23B. The subscriber line interface circuits have the same construction and operation as those of the subscriber line interface circuits already described.

Regarding FIG. 5 it should be particularly noted that the interface 23B has been incorporated into the subscriber line interface means 21B. Then, in the same manner as in the subscriber line interface means 21A shown in FIG. 4, it is possible to decrease the number of the outside terminals of the package, thus simplifying the peripheral circuits.

Figure 6A:
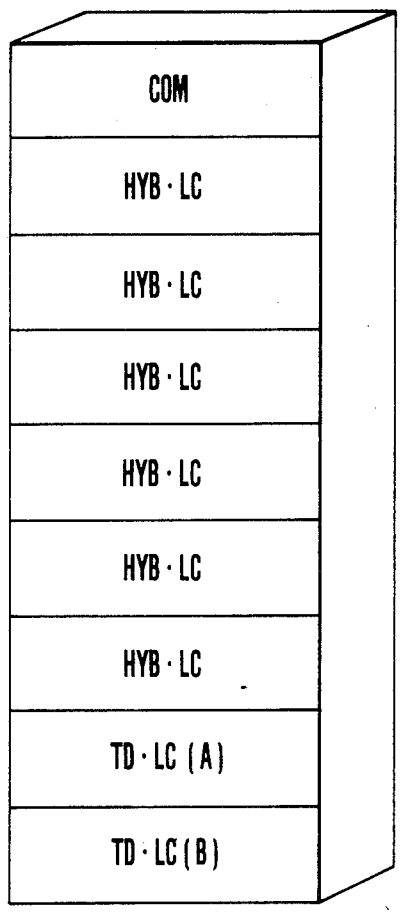
FIGS. 6a and 6b are perspective views showing examples of frame structures mounted with the system of this invention.
Figure 6B:
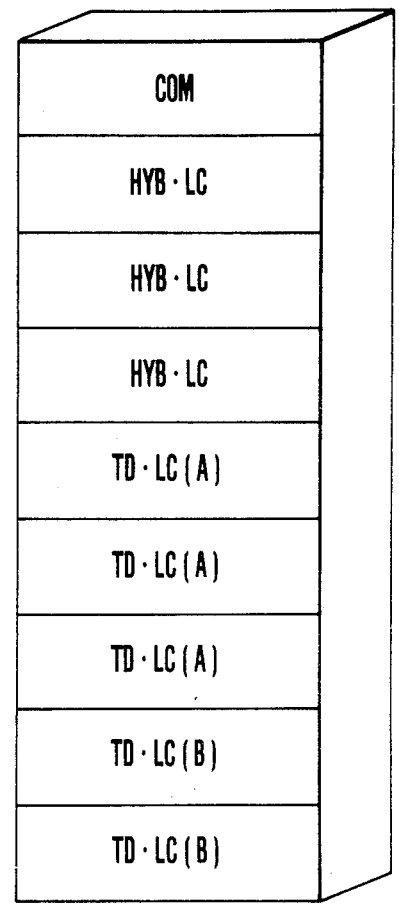

FIGS. 6a and 6b show examples in which the subscriber line interface means 21A of the first type, and a plurality of subscriber line interface means 21B of the second type are assembled into a one-stage unit and the number of units mounted on supporting frames are varied according to the number of traffic calls of a telephone exchange. In FIGS. 6a and 6b, COM designates a common control unit, HYB.LC a unit including the subscriber line interface means 21A and 21B of the first and the second type (usually about 256 lines/units), TD.LC(A) a unit for subscribers having high percentage of calls which includes the subscriber line interface means 21A of the first type (usually about 128 lines per unit), and TD.LC(B) a unit for such special subscribers as public telephone sets which includes the subscriber line interface means 21A of the first type (usually, about 64 lines per unit). In a telephone exchange office in which percentage of the subscriber calls is relatively low, a number of HYB.LC units are mounted as shown in FIG. 6a, whereas in a telephone office in which the percentage of subscriber calls is high, the mixing ratio of the interface means 21A and 21B of the HYB.LC unit is changed and the numbers of TD.LC(A) units and TD.LC(B) units mounted are increased. In addition, residence telephone sets having low percentage of calls are accommodated in the HYB.LC unit while other subscribers having high percentage of calls such as companies, offices, PBX, etc., are accommodated in the TD.LC(A) unit, while such special subscribers as public telephone sets are accommodated in the TD.LC(B) unit.

After installation, if it becomes necessary to change the degree of concentration as a result of measurement of the traffic data of a telephone office, an existing circuit means is dismounted or plugged out and then subscriber line interface means 21A and 21B are mounted or plugged in. Thus, it is possible to change the degree of concentration by such simple operation. Consequently, the versatility of the system is much higher than that of a prior art fixed system.

FIG. 7 illustrates a modification of the composite concentration system embodying the invention in which subscriber line interface means 21A and 21B are controlled by standardized software, thereby simplifying the expansion, maintenance and supervision of the software.

A telephone exchange for public telephones utilized in this system and controlled by a stored program is required to operate and maintain the software during a long life of the telephone exchange, so that it is advantageous to connect respective terminals to the digital highway under the control of standardized software. For this reason, in this modification, instead of the space division concentration switch 32 contained in the subscriber line interface means 21B of the second type and in the subscriber line interface means 21A of the first type, there is provided a fixed time division switch matrix 28 having a concentration ratio of 1:1 corresponding to the space division concentration switch 32.

With this construction, the central control device CC reads subscriber data (usually stored in a main memory device of the central control device CC) corresponding to a terminal 131 and based on the address number storing the data, it is judged that the data concerns a subscriber line interface means 21B having the space concentration switch 32, whereby a control signal for driving the space division concentration switch 32 is sent to the controllers 40 and 341 via the time division control circuit 55 of the common unit 50, time division concentration switch 54 and interfaces 52 and 23B. Then an IC switch at a cross-point XP of a matrix of the space division concentration switch 32 is closed to interconnect terminal 131 and a specific channel of the digital highway 60.

When the data read out by the central control device CC belongs to a subscriber line interface means 21A not provided with a space division concentration switch, the central control device CC sends a signal only to the controller 251 via the control circuit 55, time division concentration switch 54 and interfaces 52 and 23A, and, therefore, it is unnecessary to send out a signal corresponding to a signal sent to the controller 40 of the subscriber line interface means 21B. Although in the subscriber line interface means 21A a switch matrix 28 was provided corresponding to the space division concentration switch 32, actually, it is not necessary to provide such a switch matrix. Theoretically, it is considered that semi-fixed connections are made. Thus, the fundamental concept of this invention lies in that a standardized design is made with a link matching program including a space division concentration switch 32 accommodating subscribers having a low percentage of calls, that terminals not requiring the space division concentration switch 32 are considered to be connected semi-fixedly, that such concentration switch and its drive circuit are eliminated and that a cross-point drive instruction is not sent, or even when it is sent it is discarded.

As above described according to this embodiment, signals from subscribers having low percentage of calls are passed through the space division concentration switch 32 and then concentrated, whereas signals from special terminals or subscribers having a high percentage of calls are directly concentrated, on the time division basis, without passing them through the concentration switch. Moreover, since the system is constructed to simultaneously control these signals, the system can be economically applied to traffic conditions of a wide range and the maintenance and supervision of the software are simple.

Figure 8:
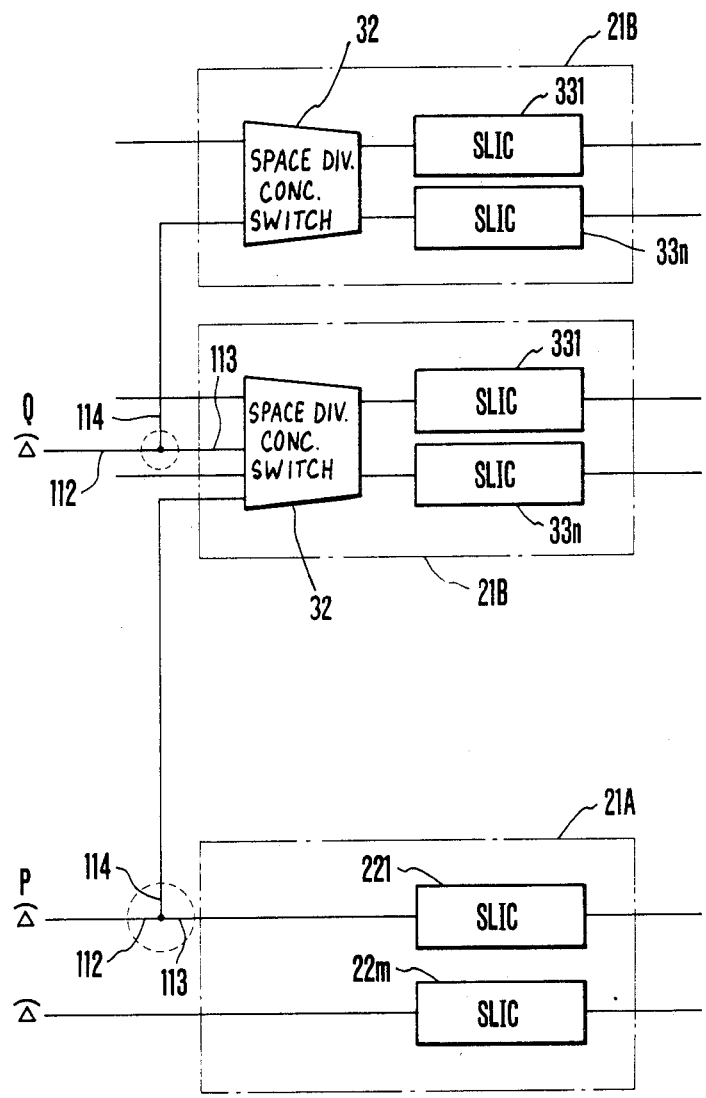
FIG. 8 is a block diagram showing still another embodiment of this invention.

In still another modification of this invention shown in FIG. 8 a telephone set P or Q are important public subscriber and it is supposed that the telephone set P is inherently accommodated by subscriber line interface means 21A. The subscriber line interface means 21A package accommodating the subscriber P also accommodates other subscribers. Should one of the packages become faulty, it is necessary to replace it with a new one, thus resulting in an interruption of the service. To prevent this, in the modification shown in FIG. 8, the talking line of the subscriber P is connected to the main subscriber line interface circuit 221 via a line 113 and is also connected to one input line of a subscriber line interface means 21B. With this construction, so long as the subscriber line interface circuit 331 is normal, such services as connections and speech are made through this subscriber line interface circuit and until a subscriber line interface means 21A to which the subscriber line interface circuit 221 belong becomes faulty or exchanged, the service can be maintained through a routine including the subscriber line interface means 21B. The detail of the connection of the elements bounded by dot and dash lines is shown in FIGS. 9a and 9b. In a case shown in FIG. 9a, when the subscriber line interface means 21A is inserted the contacts 115 and 116 are separated, and the lines 112 and 114 are disconnected. The contact 116 is connected to a floated or grounded terminal 117 formed on one surface of the board 100 of the subscriber line interface means 21A, whereas the contact 115 is connected to a contact 113 so that the software can process calls without considering a dual reversion under normal state. For exchanging a faulty subscriber line interface means 21A, when it is drawn out, the contacts 115 and 116 contact each other so as to connect the terminal 111 to the subscriber interface means 21B. At the same time, the change in the position of an accommodated subscriber and continuation of the service are made possible by sending to the central control device CC a command signal by an operator or detection of the address position of a withdrawn subscriber line interface means (an output Z shown in FIG. 9a becomes "1") when the subscriber line interface means is withdrawn. In the case shown in FIG. 9b, since the condition is a dual reversion, call detection outputs of a subscriber are produced from two portions. As a consequence, a program is prepared which makes effective only a detected output on the side of the main accommodating position under normal condition whereas the detected output on the side of an auxiliary accommodating position is made not effective, and when the main side becomes faulty, the program is switched by software.

In the foregoing, an important subscriber P in which a subscriber line interface means 21A and a subscriber line interface means 21B are apparently connected in multiple, the other importanct subscriber Q in which two interface means are connected in multiple can be treated similarly for increasing reliability.

It should be understood that the invention is not limited to the foregoing embodiments, and that many changes and modifications can readily be made by one skilled in the art without departing from the scope of the claims appended hereto.

What is claimed is:

1. A composite concentration system comprising:

a time division concentration switch for collecting and distributing digitized data;

first subscriber line interface means having a first plurality of subscriber line input terminals and a plurality of subscriber line interface circuits equal in number to said first plurality of subscriber line input terminals, each of said subscriber line interface circuits connected to one of said subscriber line input terminals and each subscriber line interface circuit having means for converting analog voice signals received at said subscriber line input terminals into digitized data and for converting digitized data received from said time division concentration switch to analog voice signals;

second subscriber line interface means having a second plurality of subscriber line input terminals equal in number to said first plurality of subscriber line input terminals, a space division concentration switch and a third plurality of subscriber line interface circuits, functionally identical to the subscriber line interface circuits of said first subscriber line interface means, said second subscriber line interface means having said second plurality of subscriber line input terminals connected to said space division concentration switch and said space division concentration switch connected to said third plurality of subscriber line interface circuits; and switch interface means having a plurality of channels connected to said time division concentration switch, said switch interface means assigning the digitized data from each of said subscriber line interface circuits of said first and second subscriber line interface means to one of said channels and for assigning the digitized data from said time division concentration switch to one of said subscriber line interface circuits.

2. The composite concentration system according to claim 1 wherein said first subscriber line interface means has a space division switch fixedly provided between said subscriber line input terminals and said subscriber line interface circuit.

3. The composite concentration system according to claim 1 wherein each of said first and second subscriber line interface means is constructed as plug-in type wherein the circuit means is formed on a printed substrate.

4. The composite concentration system according to claim 1, 2 or 3 wherein each of said first and second subscriber line interface means comprises multiplexing means provided on the output side of each subscriber line interface circuit.

5. The composite concentration system according to claim 1, 2 or 3 which further comprises means for connecting one of the subscriber line input terminals belonging to one subscriber line interface means to a subscriber line input terminal of the other subscriber line interface means.

6. The composite concentration system according to claim 5 wherein said connecting means comprises a switch contact, which when one of said subscriber line interface means to which said subscriber line input terminal belongs is removed, connects said subscriber line input terminal to the subscriber line input terminal of the other subscriber line interface means.

* * * * *

UNITED STATES PATENT AND TRADEMARK OFFICE
CERTIFICATE OF CORRECTION

PATENT NO. : 4,571,721
DATED     : February 18, 1986
INVENTOR(S) : Yasui et al

It is certified that error appears in the above-identified patent and that said Letters Patent is hereby corrected as shown below:

Column 2, line 9, delete "lower" and insert ---- low ----.

Signed and Sealed this

Twenty-fourth Day of June 1986

[SEAL]

Attest:

DONALD J. QUIGG

Attesting Officer

Commissioner of Patents and Trademarks